Patented Mar. 9, 1943

2,313,385

UNITED STATES PATENT OFFICE 2,313,385

PROCESS OF EXTRACTION OF OILS FROM HARDWOOD TAR AND PURIFICATION THEREOF

Jean Lévesque, Montreal, Quebec, Canada, assignor to The Province of Quebec, Department of Colonization, Quebec, Quebec, Canada No Drawing. Application July 24, 1939,
Serial No. 286,214

3 Claims. (Cl. 260—627)

The present invention pertains to the extraction of three different products from hardwood tar and purification of them. The three products are as follows:

First, a creosotic product, almost colorless, with a good phenolic odor and a very low non-phenolic content, and consisting principally of mono-, di- and triphenols with other phenolic compounds.

Second, a non-phenolic product of very light color, non-miscible with water, having a very supportable odor, low inflammability and a relatively high boiling range, a strong dissolving power for many organic compounds, and consisting mainly of cyclic hydrocarbons with aldehydes, ketones, anhydrides and other compounds.

Third, a water soluble product, with a low boiling range, good color and odor, having good solvent properties and consisting mainly of alcohols, and ethers of the aliphatic group.

Two kinds of tar are involved in the invention and both are obtained by wood distillation, namely, hardwood settled tar and hardwood soluble tar. The hardwood settled tar, is a tar obtained by decanting the crude liquor obtained by wood distillation and collecting the lower viscous layer. The hardwood soluble tar, is a tar obtained by distilling pyroligneous acid and collecting the residue remaining in the retort after distillation. The greatest yields of soluble tars are obtained by distillation of pyroligneous acid in vacuo or with compounds preventing the destruction of valuable products in this soluble tar.

The hardwood settled tar yields, by distillation at atmospheric pressure, a range of products boiling from 80° C. to about 280° C. The residue remaining in the retort at this temperature or at a somewhat lower temperature is called hardwood pitch. This pitch, by distillation under reduced pressure, gives a new portion of oils boiling from 170° C. to about 350° C. at an absolute pressure of 20 millimeters of mercury. The herein described method of extraction and purification is effective with all of these oils and is also effective with the whole tar.

The only differences in treating one oil or another are in the amounts of calcium oxide or hydroxide, sulfuric acid and sodium hydroxide to be added, and in the time required for fractional distillation.

The hardwood soluble tar on distillation yields a range of products boiling from 105° C. to about 280° C. at atmospheric pressure. The residue remaining in the retort at that temperature may be distilled under reduced pressure to yield a new portion of oils boiling from 170° C. to about 350° C. under an absolute pressure of 20 millimeters of mercury.

But the oils obtained from hardwood soluble tar and boiling below 180° C. or 190° C. at atmospheric pressure are mainly water soluble and consist mostly of acids and ethers. It is not practical to treat them by the process herein described. The process is effective with oils boiling above 190° C. But practically no phenolic products are obtained, the oily liquid collected consisting mainly of hydrocarbons, anhydrides, ketones or other compounds.

Whatever oil is employed, the following method is a typical example of the process according to the invention:

160 grams of technical calcium oxide are added to 1000 grams of hardwood settled tar oils having a boiling range from 180° C. to about 280° C. at atmospheric pressure. The whole is mixed and distilled at atmospheric pressure up to about 350° C. in a cast iron retort. The distillate comprises two layers which are separated by decantation. The upper layer consists of more than 500 cc. of water-insoluble organic compounds, and the lower is an aqueous solution of some alcohols and ethers of low boiling range, in very small quantities. In the 500 cc. of oil liquid collected, about one-third consists of phenolic products, the remaining two-thirds being cyclic hydrocarbons with some other compounds.

To those crude 500 cc. of oily product is added sufficient sodium hydroxide solution to dissolve the phenolic compounds and, after settling, two new layers are formed, an upper non-phenolic layer and a lower phenolic layer which are decanted from each other and purified separately as follows:

*Purification of the phenolic portion*

The phenols of the phenolic portion are first liberated from sodium hydroxide by adding weak sulfuric acid. After settling, the crude phenolic compounds are collected, heated and distilled with one per cent of concentrated sulfuric acid. This operation is repeated a second time with an addition of one-half of one per cent of lead or copper oxide in the presence of sulfuric acid. The distillate is then neutralized with sodium hydroxide solution, decanted and purified by distillation in vacuo. The product thus obtained consists of about 135 cc. of practically colorless creosote of high purity.

*Purification of the non-phenolic portion*

The upper non-phenolic portion is heated and distilled twice with one per cent of concentrated sulfuric acid. One-half of one per cent of copper or lead oxide is added in the second distillation. The distillate is neutralized with sodium hydroxide solution, decanted and purified by fractional distillation. The product thus obtained consists of about 290 cc. of neutral liquid in which most organic compounds are highly soluble and which has very good color and odor, low inflammability, and a relatively high boiling range.

*Extraction of valuable products from the initial aqueous layer*

The aqueous layer obtained in the first operation of this process is treated by fractional distillation and thereby yields some valuable products having a boiling range below 100° C., consisting mainly of alcohols with some other products.

The principal reaction of calcium oxide in the distillation at 350° C. is the destruction in the tar oils of products giving objectionable odor and color. The destruction is completed by treatment with sulfuric acid and neutralization by sodium hydroxide in the subsequent operations.

The amount of calcium oxide to be added depends largely on the oils submitted to treatment. Generally speaking, when less calcium oxide or hydroxide is added, more creosotic compounds are obtained, but their purification is somewhat more difficult. With more calcium oxide or hydroxide, less creosotic compounds are obtained, but their purification is much easier. The purification of the non-phenolic oils is practically always the same, whatever may be the amount of calcium oxide added.

The action of the sulfuric acid in the above described treatments is a destruction of unsaturated links accompanied by oxidation of some products and reduction of others due to the action of nascent sulfurous gas. Variable amounts of concentrated sulfuric acid may be employed, but in many cases one per cent of the weight of the oils has been found sufficient. In the second sulfuric acid treatment, an addition of copper or lead oxide has been found beneficial in many cases, especially for sulphur compounds.

The action of sodium hydroxide is mainly a neutralizing action particularly for sulphonated acids, which give a yellow color removed by the sodium hydroxide treatment.

The amount of calcium oxide added in the distillation described above may vary from one per cent to fifty per cent by weight of the material to which it is added.

Although specific ingredients and proportions are named herein, it will be understood that variations and substitution of equivalents can be made within the scope of the invention as indicated by the appended claims.

What I claim is:

1. The process of extracting oils from the fraction boiling at 80° C. to about 280° C. in the distillate from crude hardwood settled tar which comprises adding one to fifty parts of weight of calcium oxide to one hundred parts by weight of hardwood settled tar oils boiling between 80° C to about 280° C. under atmospheric pressure, heating and distilling the mixture under atmospheric pressure, and collecting the distillate, separating the layers from each other, adding to the oily layer sufficient alkali to dissolve the phenolic compounds, separating the two new layers obtained by the addition af alkali.

2. The process of extracting oils from the fraction boiling at 80° C. to about 280° C. in the distillate from crude hardwood settled tar which comprises adding one to fifty parts of weight of calcium oxide to one hundred parts by weight of hardwood settled tar oils boiling between 80° C. to about 280° C. under atmospheric pressure, heating and distilling the mixture under atmospheric pressure, and collecting the distillate between 80° C. to about 280° C. separating the layers from each other, adding to the oily layer sufficient alkali to dissolve the phenolic compounds, separating the two new layers obtained by the addition of alkali, treating the upper non-phenolic new layer with one-tenth to ten per cent by weight of sulphuric acid, neutralizing the oily liquid thus obtained, and finally separating said oily liquid and purifying it by distillation.

3. The process of extracting oils from the fraction boiling at 80° C. to about 280° C. in the distillate from crude hardwood settled tar which comprises adding one to fifty parts of weight of calcium oxide to one hundred parts by weight of hardwood settled tar oils boiling between 80° C. to about 280° C. under an atmospheric pressure, heating and distilling the mixture under atmospheric pressure, and collecting the distillate between 80° C. to about 280° C., separating the layers from each other, adding to the oily layer sufficient alkali to dissolve the phenolic compounds, separating the two new layers obtained by the addition of alkali, adding to the lower phenolic new layer sufficient acid to liberate the phenolic compounds, treating those phenolic compounds with $\frac{1}{10}$% to 10% of sulphuric acid, neutralizing the excess sulphuric acid in the product thus obtained, and finally purifying this product by distillation.

JEAN LÉVESQUE.